United States Patent
Katkade et al.

(10) Patent No.: US 9,075,594 B2
(45) Date of Patent: Jul. 7, 2015

(54) POWER NEGOTIATION PROTOCOL

(75) Inventors: Vaibhav S. Katkade, Sunnyvale, CA (US); Premkumar Jonnala, San Jose, CA (US); Anoop Vetteth, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 622 days.

(21) Appl. No.: 13/292,259

(22) Filed: Nov. 9, 2011

(65) Prior Publication Data

US 2013/0117581 A1 May 9, 2013

(51) Int. Cl.
*G06F 1/26* (2006.01)
*H04L 12/10* (2006.01)

(52) U.S. Cl.
CPC .............. *G06F 1/266* (2013.01); *H04L 12/10* (2013.01)

(58) Field of Classification Search
CPC .............. G06F 1/3203; G06F 1/266; H02J 2007/0062; H02J 2007/006; H04L 12/10; H04L 12/40045
USPC .............................. 713/300, 310, 320; 710/15
See application file for complete search history.

(56) References Cited

U.S. PATENT DOCUMENTS

| | | | | |
|---|---|---|---|---|
| 7,392,407 B2 * | 6/2008 | Jonnala et al. | ................ | 713/300 |
| 7,471,014 B2 * | 12/2008 | Lum et al. | ................ | 307/83 |
| 7,593,756 B2 * | 9/2009 | Ferentz et al. | ................ | 455/572 |
| 7,603,570 B2 * | 10/2009 | Schindler et al. | ............. | 713/300 |
| 8,078,889 B2 * | 12/2011 | Jonnala et al. | ................ | 713/310 |
| 8,185,764 B2 * | 5/2012 | Bobrek | ......................... | 713/324 |
| 8,266,463 B2 * | 9/2012 | Jonnala et al. | ................ | 713/310 |
| 8,499,177 B2 * | 7/2013 | Balasubramanian et al. | | 713/300 |
| 2005/0268120 A1 * | 12/2005 | Schindler et al. | ............. | 713/300 |
| 2010/0100750 A1 * | 4/2010 | Bobrek | ......................... | 713/300 |
| 2010/0211806 A1 * | 8/2010 | Diab et al. | .................... | 713/310 |
| 2012/0218879 A1 * | 8/2012 | Robitaille et al. | ............ | 370/216 |
| 2013/0049469 A1 * | 2/2013 | Huff et al. | ....................... | 307/62 |
| 2013/0297955 A1 * | 11/2013 | Balasubramanian et al. | | 713/310 |

* cited by examiner

*Primary Examiner* — Dennis M Butler

(74) *Attorney, Agent, or Firm* — Campbell Stephenson LLP

(57) ABSTRACT

In one embodiment, a method includes a first device providing a first power to a second device using a first set of conductors out of a plurality of conductors. The method includes the first device providing, in response to receiving a notification, a second power to the second device using the first and a second set of conductors out of a plurality of conductors. The notification indicates that the second device can be supplied with a second power using the first set of conductors and a second set of conductors out of the plurality of conductors, and can also specify the configuration for enabling the second power.

27 Claims, 11 Drawing Sheets

| TLV Type | TLV Info String Length | OUI ID | OUI Subtype | PSE/PD Capabilities |
|---|---|---|---|---|
| 7 bits | 9 bits | 3 octets | 1 octet | 1 octet |

| Bit | Function | Value / Meaning |
|---|---|---|
| 0 | 4-Pair PoE Support | 0 = No<br>1 = Yes |
| 1 | Spare Pair Detection / Classification Required | 0 = No<br>1 = Yes |
| 2 | PD Spare Pair Desired State | 0 = No<br>1 = Yes |
| 3 | PSE Spare Pair Operational State | 0 = No<br>1 = Yes |
| B 4:7 | Reserved / Optional | |

POWER NEGOTIATION PROTOCOL

FIELD OF THE INVENTION

The present disclosure relates generally to a power negotiation protocol that is used in a communication network.

BACKGROUND OF THE INVENTION

Communication networks allow network devices to communicate between each other. A communication network can connect these network devices to facilitate sending and receiving of communication among these interconnected devices. Communication protocols define the format and rules for exchanging communication using such a communication network. Some communication networks use physical cables for these connections. Furthermore, there are additional network devices that facilitate communication between network devices that are included on different portions of a larger communication network. These additional network devices can provide routing functionality that can route communication from a network device on one network portion to another network device on another network segment.

BRIEF DESCRIPTION OF THE DRAWINGS

The present invention may be better understood, and its numerous objects, features, and advantages made apparent to those skilled in the art by referencing the accompanying drawings.

FIG. 8 illustrates contents of an example notification that can be sent between a powered device and a power sourcing device, according to one embodiment.

FIG. 9 illustrates contents of an example notification that can be sent between a powered device and a power sourcing device, according to one embodiment.

Figure 1:
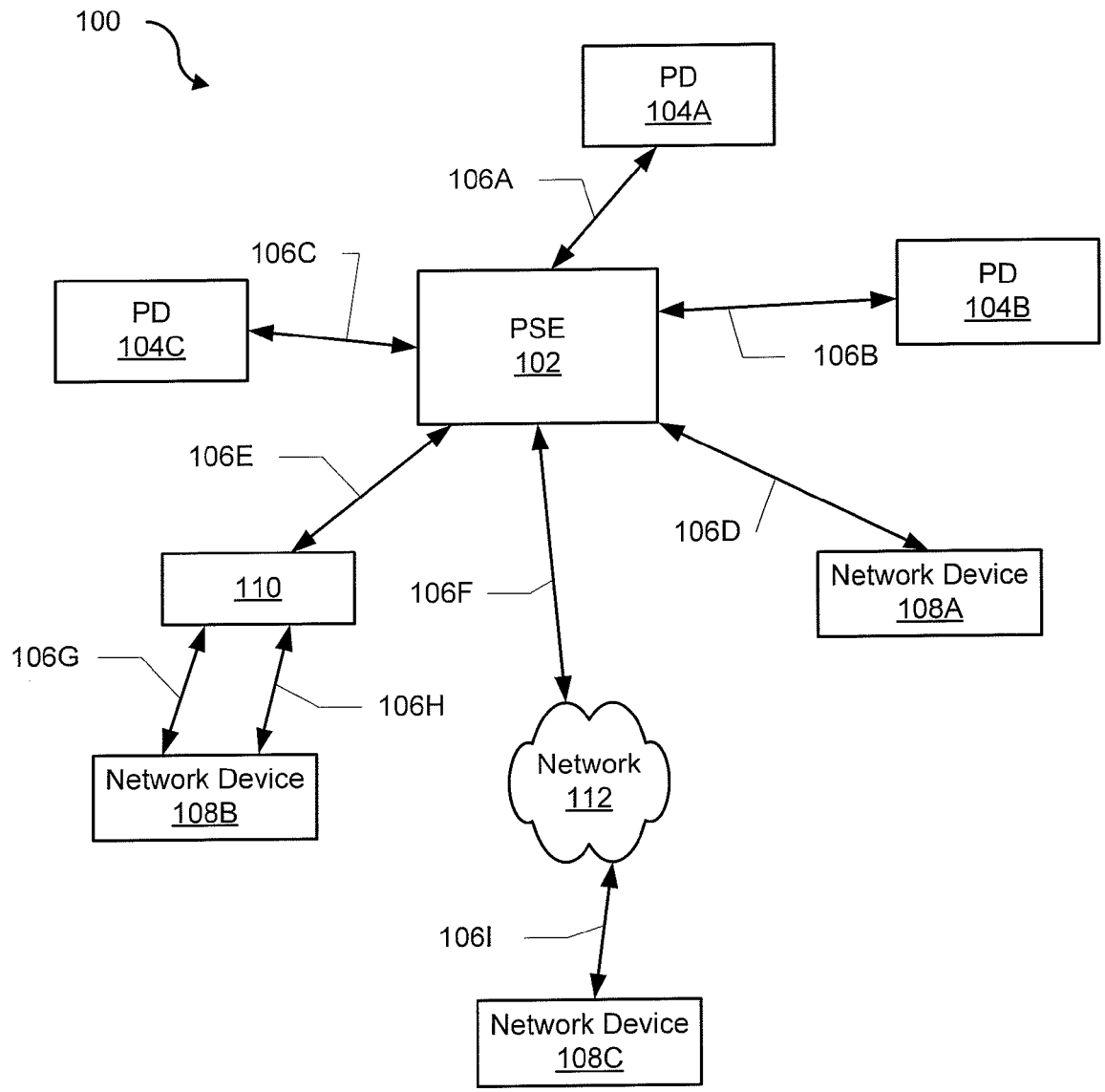
FIG. 1 is a block diagram illustrating a system that includes various network devices, including powered devices and a power sourcing device, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Overview

A method is provided for a power negotiation protocol. The method includes a first device providing a first power to a second device using a first set of conductors. The method includes the first device providing, in response to receiving a notification, a second power to the second device using the first and a second set of conductors. The notification indicates that the second device can be supplied with a second power using the first set of conductors and a second set of conductors.

Another method is provided for a power negotiation protocol. The method includes receiving a first power from a power provider using a first set of conductors. The method includes sending a notification to the power provider, where the notification indicates that a second power can be supplied using the first set of conductors and a second set of conductors. The method also includes receiving the second power from the power provider using the first and the second set of conductors.

Example Embodiments

FIG. 1 is a block diagram illustrating a system 100 that includes various network devices, including powered devices and a power sourcing device, according to one embodiment. System 100 includes a power sourcing device 102, also referred to as a powered sourcing equipment (PSE). System 100 also includes several powered devices (PDs) 104A-104C, network devices 108A-108C, and a power splitter 110. Network device 108C couples with PSE 102 via a network 112.

PSE 102 can provide power to at least one of powered devices (PDs) 104A-104C using connections 106A-106C, respectively. Thus, PSE 102 acts as a power provider to various PDs 104A-104C. In one embodiment, PSE 102 can also provide data communication to/from PDs 104A-104C using connections 106A-106C. In one embodiment, PSE 102 is configured to route communication between various PDs 104A-104C, and/or network devices 108A-108C. PSE 102 can implement a power negotiation protocol to determine whether any of PDs 104A-104C and/or network devices 108A-108C have a power-over-connection capability, and if so, what type. PSE 102 is able to provide power to PDs 104A-104C based on this determination.

In one embodiment, each of PDs 104A-104C is able to receive power and communication (i.e., have a power-over-connection capability) from PSE 102 over connections 106A-106C, respectively. For example, PD 104A is able to receive power from PSE 102 over connection 106A, and PD 104B is able to receive power from PSE 102 over connection 106B. PD 104A may also send and receive communication (e.g., data communication) over connection 106A. Similarly, PD 104B may also send and receive communication (e.g., data communication) over connection 106B. In this example, communication from PD 104A can be transmitted via connection 106A, through PSE 102, and then via 106B to PD 104B, and vice-versa. However, each of PDs 104A-104C can have a different type of a power-over-connection capability.

Each of the connections 106A-106C can facilitate communication between PSE 102 and PDs 104A-104C. In one embodiment, each of the connections 106A-106C includes two sets of conductors. For example, connection 106A includes a first set of conductors and a second set of conductors, and similarly for other connections 106B-106C. Furthermore, each of the connections 106A-106F can carry communication between PDs 104A-104C, network devices 108A-108B, and/or PSE 102. In one embodiment, system 100 may illustrate a local communication network, such as an intranet, that facilitates communication between various devices, e.g., PDs 104A-104C and network devices 108A-108C. In some embodiments, each connection includes three or more sets of conductors.

For example, the connections in system 100 may be implemented using Ethernet cables, such as Cat-5 and/or Cat-6 cables. Continuing with this example, each PD/network device may be an Ethernet device. PSE 102 can provide communication and power-over-Ethernet functionality to PDs 104A-104C, and Ethernet communication to network devices 108A-108C. PSE 102 can implement a power negotiating protocol to determine if each PD/network device has a power-over-connection (e.g., a power-over-Ethernet) capability, and if so, what type. In accordance with this determination, PSE 102 can provide communication to network devices 108A and 108C, power using one set of conductors to PDs that have a power-over-connection capability supporting one conductor set, and power using both sets of conductors to PDs that have a power-over-connection capability supporting two conductor sets. PSE 102 would also provide communication (e.g., route communication to/from) using the first and/or second set of conductors to the PDs regardless of their power-over-connection capability. It is noted that the use of power splitter 110 allows PSE 102 to provide power to network device 108B, even though network device 108B does not have any power-over-connection capability.

In one embodiment, PSE 102 can supply power (i.e., a first power) to PD 104A. PSE 102 can supply that power to PD 104A using a first set of conductors of connection 106A. Once PD 104A receives this power, PD 104A may notify PSE 102 that PSE 102 can supply additional power using a second set of conductors of connection 106A. In one implementation, PD 104A can send such a notification using connection 106A to PSE 102. PSE 102, in response to receiving this notification, can then provide additional power over the second set of conductors of connection 106A. As a result, PSE 102 can supply power (i.e., a second power) to PD 104A using both sets of conductors of connection 106A.

In one embodiment, PSE 102 is also configured to provide switching and/or routing services to various PDs 104A-104C and network devices 108A-108C, some of which may not be able to receive power using both sets of conductors, or receive any power at all from PSE 102. For example, PSE 102 may route communications between network device 108A and PD 104B. PD 104B may be able to receive power using a first but not a second set of conductors of connection 106B. In this case, since PD 104B is not able to receive power using both sets of conductors of connection 106B, PD 104B would not send a notification indicating that PSE 102 can supply additional power using a second set of conductors of connection 106B. As a result, PSE 102 will supply power using one set (e.g., the first set) of conductors to PD 104B.

Similarly, PSE 102 can determine that network device 108A does not have any power-over-connection capability, and as a result, PSE 102 will not supply power to network device 108A via connection 106D. As an example, network device 108A may be independently powered (e.g., using batteries and/or another power source). In this case, PSE 102 would just route communication between network device 108A and other devices in system 100.

Furthermore, power splitter 110 may be able to provide power to network device 108B that is not compatible with receiving power using connection 106E. In this implementation, power splitter 110 may present itself (to PSE 102) as a device that can accept power-over-connection using connection 106E. Thus, PSE 102 would supply power using at least one set of conductors of connection 106E. If power splitter 110 is able to accept power over a second set of conductors of connection 106E, power splitter 110 would send a notification to PSE 102 informing PSE 102 of this capability. PSE 102 would then provide power using both sets of conductors to power splitter 110. PSE 102 also facilitates communication between network device 108B and the other devices (e.g., PDs 104A-104C and network device 108A) in system 100. Power splitter 110 can provide communication to network device 108B using connection 106G and provide power to network device 108B using a power connection 106H. In one embodiment, connections 106E and 106F may be of similar type, such as a cat-5 cable. However, power connection 106H may be of a different type, such as one used by a conventional power cable. As a result, power splitter 110 facilitates use of a network device 108B in location where a conventional power source is not readily available.

System 100 also includes a network device 108C. As shown, network device 108C can communicate with PSE 102, and thus other devices in system 100, using a network 112. In one embodiment, network device 108C is located in a different network portion of system 100. As such, the portion of system 100 without network 112 may illustrate a local area network (LAN), and network 112 may illustrate a wide area network (WAN) portion of system 100. In one embodiment, network 112 may be some variation of the Internet that includes multiple switching/routing elements. In this (and similar network architectures), PSE 102 may provide communication, but not power, to network device 108C.

In one embodiment, PSE 102 described herein can be used in a system 100 that contains devices having various types of power-over-connection capability, i.e., PSE 102 can be backward compatible. In other words, PSE 102 can be used in existing networks to provide communication to all devices, power-over-connection using one set of conductors to certain PDs, and power-over-connection using two sets of conductors to PDs that have this power-over-connection capability. By providing power-over-connection using two sets of conductors, PSE 102 can provide more power to PDs that support this capability. For example, each conductor set of existing cables (such as Cat-5) can support a limited amount of power until its physical limits (such as amount of current and/or voltage that can be carried) are reached. Existing power-over-Ethernet systems (such as IEEE 802.3 af/at) implement power-over-connection using one set of conductors of a cat-5 cable. As such, these existing power-over-Ethernet implementations can supply a limited amount of power to each PD, such as up to 30 W per connection.

PSE 102 implementing the power negotiation protocol described herein can negotiate, with compatible PD devices, power-over-connection using two sets of conductors to PDs that have this power-over-connection capability. Once PSE 102 and a PD negotiates this power-over-connection using two sets of conductors capability, PSE 102 can supply power using both sets of conductors to the PD, thus potentially providing more power to that PD. However, the actual amount of power that is supplied to each PD can be later negotiated (e.g., after establishing a power-over-connection capability)

between PSE 102 and each PD. In one embodiment, the power negotiation protocol can also be used to disable power on the second set of conductors. For example, PSE 102 can also notify each PD when PSE 102 has either enabled or disabled power on the second set of conductors.

Figure 2:
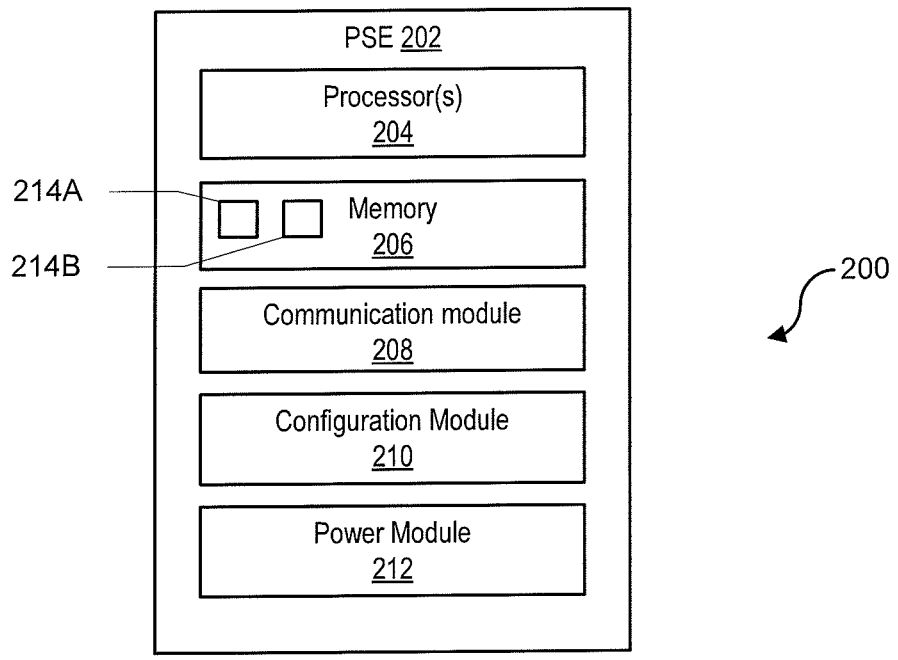
FIG. 2 is a block diagram illustrating a power sourcing device, according to one embodiment.

FIG. 2 is a block diagram 200 illustrating a power sourcing device (PSE 202), according to one embodiment. PSE 202 may be an example implementation of PSE 102 of FIG. 1. As illustrated, PSE 202 includes one or more processors 204, a memory 206, a communication module 208, a configuration module 210, and a power module 212. It is noted that in some embodiments, some of these elements may be combined. For example, memory 206 may include one or more of communication module 208, configuration module 210, and/or power module 212. It is also noted that one or more of communication module 208, configuration module 210, and/or power module 212 may be implemented as a software and/or hardware module. It is also noted that in some embodiments, one or more of elements of PSE 202 may not be used.

Thus, PSE 202 includes one or more processors 204 (e.g., microprocessors, programmable logic devices (PLDs), or application specific integrated circuits (ASICs)) configured to execute program instructions stored in memory 206. Memory 206 can include various types of RAM, Read Only Memory (ROM), Flash memory, micro electro-mechanical systems (MEMS) memory, magnetic core memory, and the like. Memory 206 can include both volatile and non-volatile memory. Processor(s) 204, memory 206, communication module 208, configuration module 210, and/or power module 212 may send and receive data and/or control signals, and/or provide power, such as by using connections (e.g., connections 106A-106F of FIG. 1).

In some embodiments, memory 206 can also include power configurations, such as power configurations 214A and 214B. It is noted that although two power configurations are shown, PSE 202 may use additional power configurations, as desired. It is also noted that PSE 202 may use one power configuration, e.g., power configuration 214A, and update that power configuration with configuration changes, as desired. Each power configuration can store configuration information regarding power-over-connection capability of PSE 202 and/or device(s) on the network (e.g., network 112). As a result, each power configuration can be used to determine how, if any, power can be supplied using each connection (e.g., each of connections 106A-106F) to each respective device (e.g., each PD). For example, each connection may have an associated power configuration. In another example, each device may have an associated power configuration. In yet another example, a new configuration may be used for various steps of the power negotiation protocol, as desired.

For example, with reference to FIG. 1, a power configuration (e.g., power configuration 214A) can include information regarding power that can be supplied by PSE 102 to PD 104A using connection 106A. Power configuration can indicate that initially PSE 102 can supply power using one set of conductors of connection 106A. Once PSE 102 performs power negotiation, (such as by including receiving a notification), this power configuration can be updated (or a new power configuration can be generated) that specifies that PSE 102 can supply power to PD 104A using both sets of conductors of connection 106A. The power configuration can also specify a level of power, collectively or specified per set of conductors, that is to be supplied using connection 106A to PD 104A.

Figure 3:
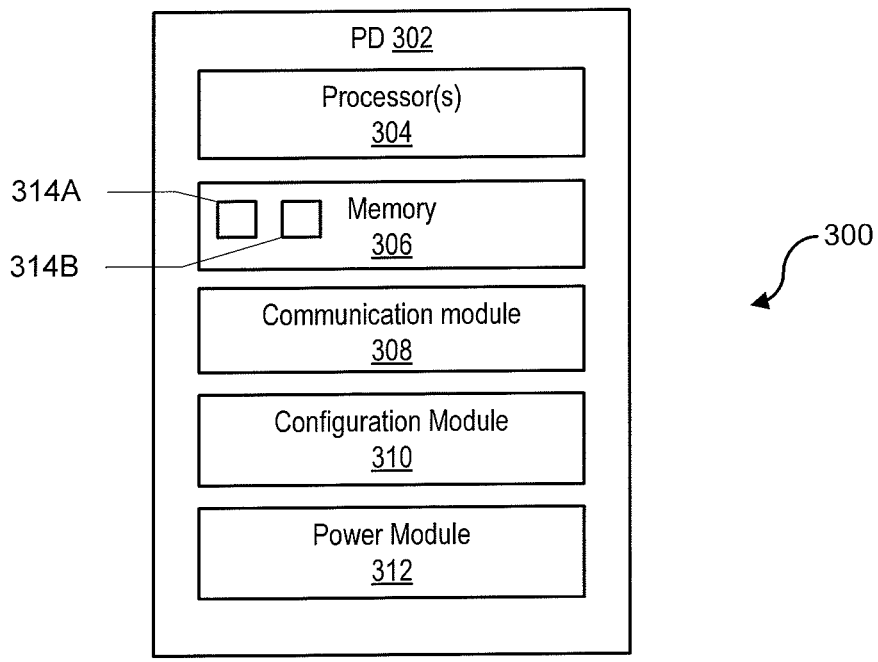
FIG. 3 is a block diagram illustrating a powered device, according to one embodiment.

FIG. 3 is a block diagram 300 illustrating a powered device (PD 302), according to one embodiment. PD 302 may be an example implementation of any of PDs 104A-104D of FIG. 1. As illustrated, PD 302 includes one or more processors 304, a memory 306, a communication module 308, a configuration module 310, and a power module 312. It is noted that is some embodiments, one or more of these elements may be combined. For example, memory 306 may include one or more of communication module 308, configuration module 310, and/or power module 312. It is also noted that one or more of communication module 308, configuration module 310, and/or power module 312 may be implemented as a software and/or hardware module. It is also noted that in some embodiments one or more of elements of PD 302 may not be used.

Thus, PD 302 includes one or more processors 304 (e.g., microprocessors, programmable logic devices (PLDs), or application specific integrated circuits (ASICs)) configured to execute program instructions stored in memory 306. Memory 306 can include various types of RAM, Read Only Memory (ROM), Flash memory, micro electro-mechanical systems (MEMS) memory, magnetic core memory, and the like. Memory 306 can include both volatile and non-volatile memory. Processor(s) 304, memory 306, communication module 308, configuration module 310, and/or power module 312 may send and receive data and/or control signals, and/or receive power, such as by using connection 106A of FIG. 1.

In some embodiments, memory 306 can also include power configurations, such as power configurations 314A and 314B. It is noted that although two power configurations are show, PD 302 may use additional power configurations, as desired. It is also noted that PD 302 may use one power configuration, e.g., power configuration 314A, and update that power configuration with configuration changes, as desired. Each power configuration can store configuration information regarding power-over-connection capability of PSE 202 and/or PD 302. As a result, each power configuration can be used to determine how, if any, power can be received using a respective connection (106A-106E) by PD 302.

For example, with reference to FIG. 1, power configuration (e.g., power configuration 314A) can include information regarding the power that can be received by PD 104A from PSE 102 using connection 106A. Power configuration can indicate that initially PD 104A can receive power using one set of conductors of connection 106A. Once PD 104A performs power negotiation (such as by including sending a notification), this power configuration can be updated (or a new power configuration can be generated) that specifies that PD 104A can receive power using both sets of conductors of connection 106A. The power configuration can also specify a level of power, collectively or specified per set of conductors, that is to be supplied by PSE 102 using connection 106A to PD 104A.

Figure 4:
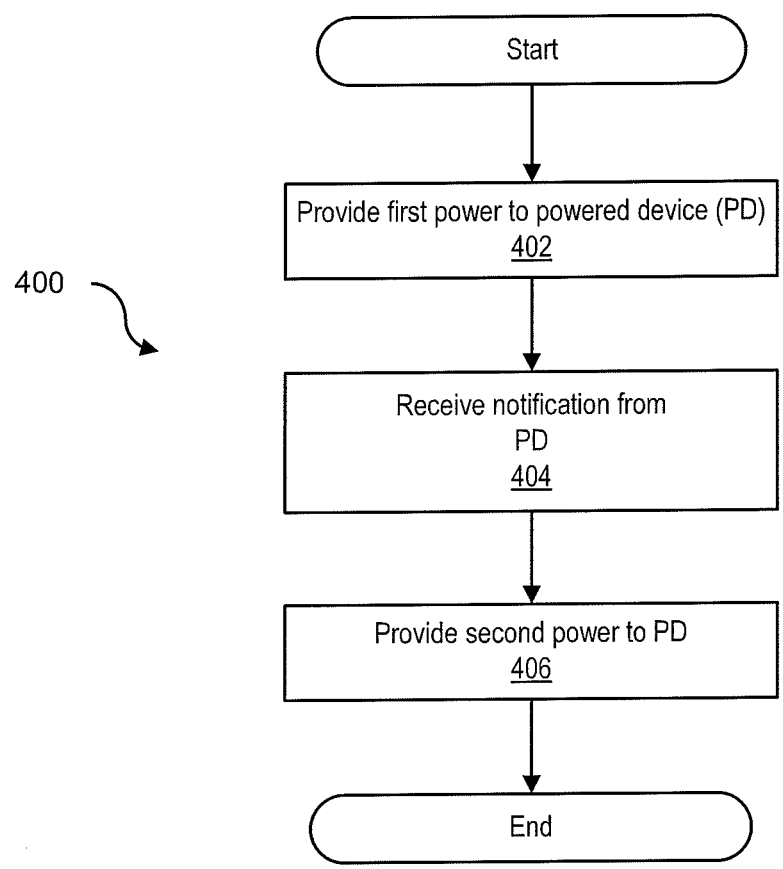
FIG. 4 is a flowchart illustrating a method of using a power sourcing device, according to one embodiment.

Referring now to FIG. 4, one embodiment of a method 400 of a power negotiation protocol usable by a power sourcing device is disclosed. Method 400 may be modified by those skilled in the art in order to derive alternative embodiments. Also, steps in this embodiment are shown in sequential order. However, some steps may occur in a different order than shown, some steps may be performed concurrently, some steps may be combined with other steps, and some steps may be absent in another embodiment. Method 400 is described with reference to FIGS. 1, 2, and 3.

In one embodiment, executable instructions for implementing method 400 can be stored in memory, such as memory 206, and be executed by processor(s) 204 of PSE 202. In one embodiment, instructions for method 400 can be distributed among one or more of memory, communication module 208, configuration module 210, and/or power module 212, and be executed by processor(s) 204. In one embodiment, some or all of instructions for method 400 can be stored and/or executed by a device that is separate from PSE 202. For example, instructions for method 400 can be executed by this separate device, e.g., a power master device (not shown). This separate device can communicate with PSE 202 to instruct PSE 202 to perform various elements of method 400. In this implementation, the separate device may communicate with PSE 202 using the same connection(s) as shown in system 100. In another implementation, the separate device can communicate with PSE 202 using another medium, such as via wireless communication.

In step 402, power is provided by a power sourcing device (e.g., PSE 102) to a powered device (e.g., PD 104A) using a first set of conductors of a connection (e.g., connection 106A). In one embodiment, PSE 102 may provide an initial power to PD 104A using one set of connectors after determining that PD 104A is able to accept power being sent using the first set of connectors. For example, PSE 102 can make the determination (e.g., initial classification) whether to supply the initial power by receiving initial communication from PD 104A that is indicative of such capability. One such implementation can be performed using IEEE 802.3 af/at power protocol negotiation, among others.

In one embodiment, prior to receiving any such the initial communication, PSE 102 can send communication, such as an inquiry, to PD 104A, such as via connection 106A. It is noted that, depending on implementation, this inquiry may include an analog technique of sending a certain current and/or voltage to PD 104A, or it may include sending a communication packet, such as a control signal. This inquiry inquires PD 104A of its power-over-connection capability, e.g., capability of receiving power using connection 106A (i.e., using a first set of conductors of connection 106A). PSE 102 may receive a response (e.g., the initial communication) from PD 104A, where this response indicates power-over-connection capabilities of PD 104A. Upon receiving this response, PSE 102 may generate a first power configuration (e.g., configuration 214A of FIG. 2) and/or may generate the initial power based on this first response (e.g., according to the indicated power-over-connection capability).

Thus, PSE 102 can generate a first power configuration (e.g., configuration 214A of FIG. 2) that indicates that PSE 102 can provide initial power to PD 104A device using the first set of conductors. PSE 102 can then provide the initial power in accordance with the first power configuration. In one implementation, the initial power is supplied in accordance with IEEE 802.03 af/at, which defines how power and communication can be transmitted using Ethernet and Cat-5 cables.

In step 404, the power sourcing device (PSE 102) receives a notification from the powered device (PD 104A). The notification indicates that the powered device (PD 104A) can be supplied with a second power using the first set of conductors and a second set of conductors. The notification can be sent from PD 104A to PSE 102 using connection 106A, using the first, second, and/or both sets of conductors of connection 106A.

In one embodiment, PSE 102 can first send an initial notification to PD 104A, where this initial notification indicates that PSE 102 can provide the second power using the first and second set of conductors. In this embodiment, PD 104A can respond to this initial notification by sending the notification to PSE 102.

In one embodiment, PSE 102 can generate a second power configuration that indicates that PSE 102 can provide the second power to PD 104A device using the first and the second sets of conductors. The second power configuration can indicate that PSE 102 can provide the second power to PD 104A using the first and second set of conductors. Depending on the implementation, PSE 102 can modify the first power configuration (e.g., configuration 214A of FIG. 2), or generate a second power configuration 214B that includes configuration information for generating the second power.

In step 406, in response to receiving the notification, the power sourcing device (e.g., PSE 102) can provide the second power using the second set of conductors. In one embodiment, PSE 102 can provide the second power in accordance with the second power configuration.

It is noted that with respect to the discussion herein, the initial (e.g., first) power and second power indicate a certain amount of power that can be provided from a PSE to a PD, as described below. The initial power that is provided from PSE to PD can include any amount of power (subject to a limit) that can be supplied using one set of conductors of a certain connection. In this example, a connection may include two sets of conductors. The connection, such as connections 106A-106F, can carry both communication and power. However, the amount of power that can be carried by such a connection may be limited by physical limitations of its conductors. For example, a Cat-5 category cable is rated to carry a certain amount of power before reaching its physical limitations (e.g., overheating, burning out, etc.). The second power can be supplied by a PSE using both the first set and the second set of conductors.

Figure 5:
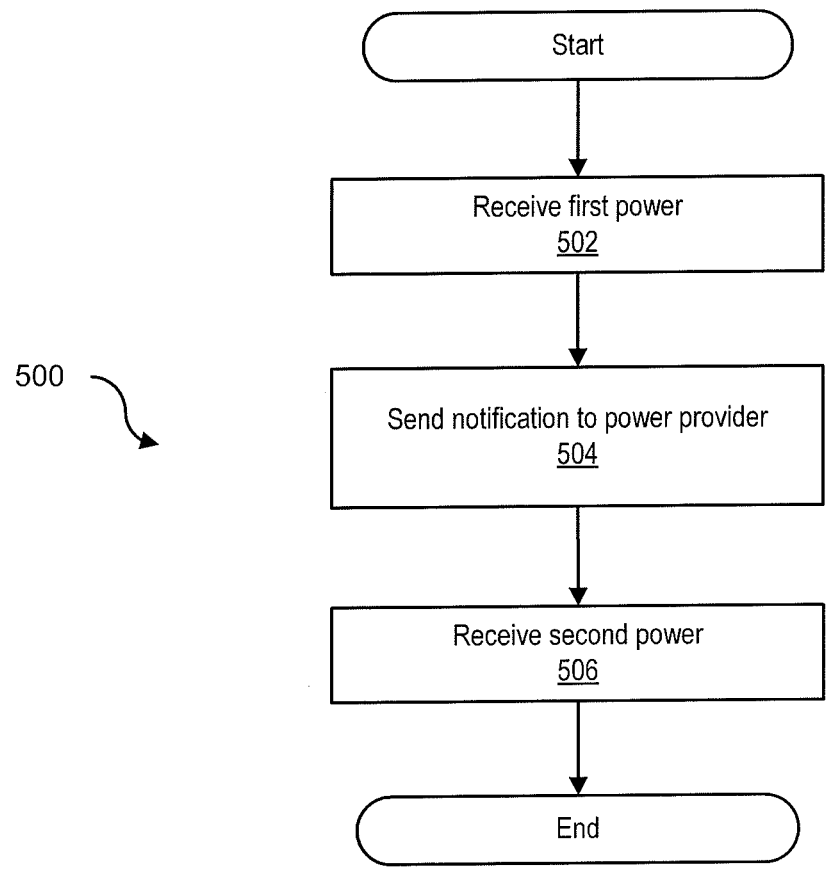
FIG. 5 is a flowchart illustrating a method of using a powered device, according to one embodiment.

Referring now to FIG. 5, one embodiment of a method 500 of a power negotiation protocol usable by a powered device is disclosed. Method 500 may be modified by those skilled in the art in order to derive alternative embodiments. Also, steps in this embodiment are shown in sequential order. However, some steps may occur in a different order than shown, some steps may be performed concurrently, some steps may be combined with other steps, and some steps may be absent in another embodiment. Method 500 is described with reference to FIGS. 1, 2, and 3.

In one embodiment, executable instructions for implementing method 500 can be stored in memory, such as memory 306, and be executed by processor(s) 304 of PD 302. In one embodiment, instructions for method 500 can be distributed among one or more of memory, communication module 308, configuration module 310, and/or power module 312, and be executed by processor(s) 304. In one embodiment, some or all of instructions for method 500 can be stored and/or executed by a device that is separate from PD 302. For example, instructions for method 500 can be executed by this separate device (not shown). This separate device can communicate with PD 302 to instruct PD 302 to perform various elements of method 500. In this implementation, the separate device may communicate with PD 302 using the same connection(s) as shown in system 100. In another implementation, the separate device can communicate with PD 302 using another medium, such as via wireless communication.

In step 502, power is received by a powered device (e.g., PD 104A) from a power sourcing device (e.g., PSE 102) using a first set of conductors of a connection (e.g., connection 106A). In one embodiment, PSE 102 may provide an initial power to PD 104A using one set of connectors after determining that PD 104A is able to accept power being sent using the first set of connectors. For example, PD 104A can send initial communication to PSE 102 informing PSE 102 of such capability of being able to receive the initial power. One such implementation can be performed using IEEE 802.3 af/at power protocol negotiation, e.g., as a part of initial classification.

In one embodiment, prior to sending any such initial communication, PD 104A can receive communication, such as an inquiry, from PSE 102, via connection 106A. It is noted that, depending on an implementation, this inquiry may be include an analog technique of receiving a certain current and/or voltage, or it may include sending a communication packet, such as a control signal. Upon receiving of this inquiry, PD 104A may respond, either by using an analog signal, or by using a digital signal, e.g., a communication packet, with its power-over-connection capability, e.g., that it is capable of receiving power over the first set of conductors of connection 106A. In event that PD 104A does not respond, PSE 102 may interpret this lack of response to mean that PD 104A does not have any power-over-connection capability. PSE 102 may also inquire PD 104A again at a different time(s), as desired.

Thus, PD 104A can generate a first power configuration (e.g., configuration 314A of FIG. 3) that indicates that PD 104A can receive the initial power using the first set of conductors. PD 104A can then receive the initial power in accordance with the first power configuration.

In step 504, the powered device (PD 104A) sends a notification to the power sourcing device (PSE 102). The notification indicates that the powered device (PD 104A) can be supplied with a second power using the first set of conductors and a second set of conductors. The notification can be sent from PD 104A to PSE 102 using connection 106A, using the first, second, and/or both sets of conductors of connection 106A.

In one embodiment, PD 104A can first receive an initial notification from PSE 102, where this initial notification indicates that PSE 102 can provide the second power to PD 104A using the first and second set of conductors. In this embodiment, PD 104A can respond to this initial notification by sending the notification to PSE 102.

In one embodiment, PD 104A can generate a second power configuration that indicates that PD 104A can receive the second power using the first and the second sets of conductors. Depending on the implementation, PD 104A can modify the first power configuration (e.g., configuration 314A of FIG. 3) or generate a second power configuration (e.g., configuration 314B) that includes configuration information for receiving the second power.

In step 506, the powered device (e.g., PD 104A) can receive the second power using the second set of conductors. In one embodiment, PD 104A can receive the second power in accordance with the second power configuration.

Figure 6:
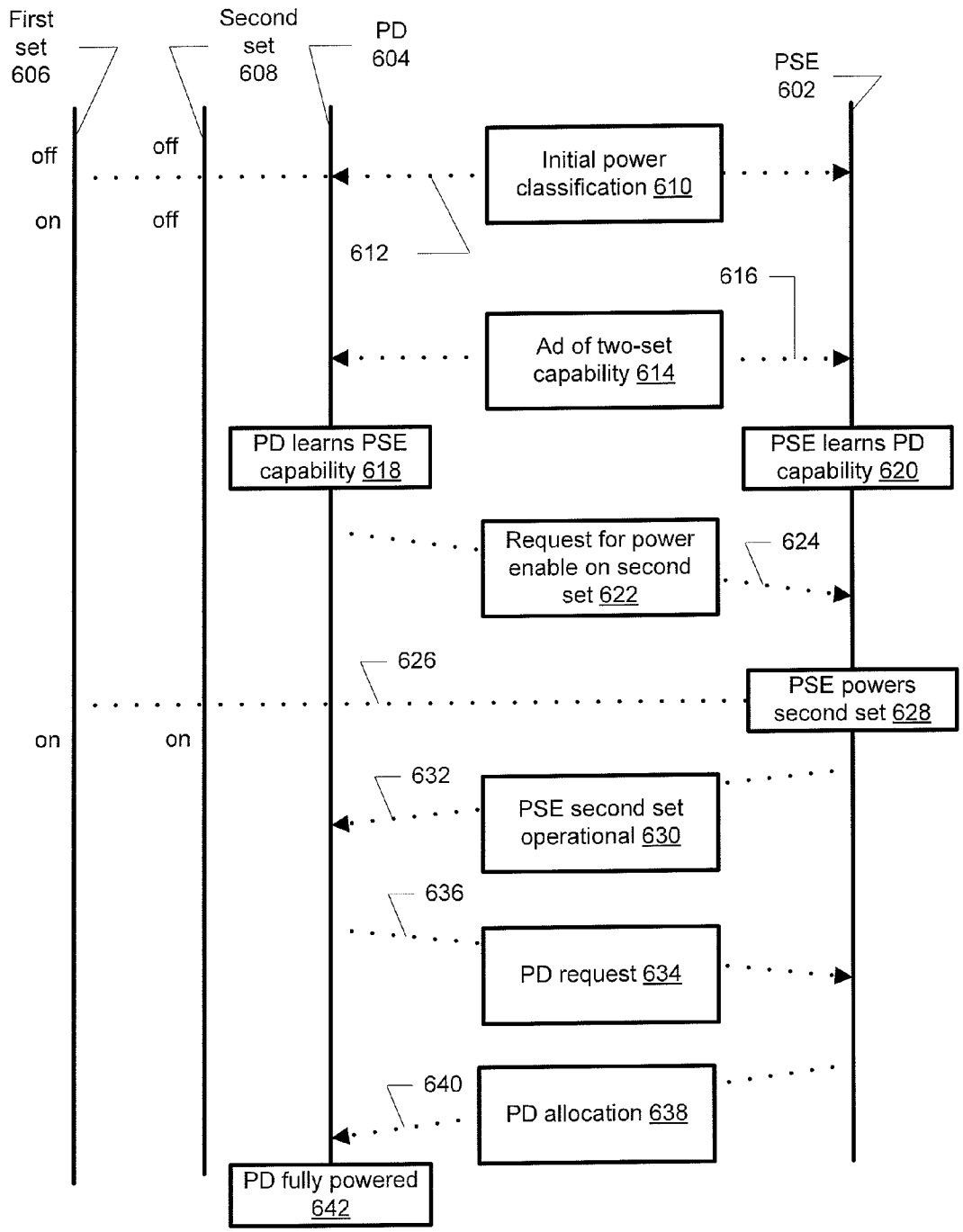
FIG. 6 is a diagram illustrating operation of a powered device and a power sourcing device, according to one embodiment.

FIG. 6 is a diagram 600 illustrating operation of a powered device and a power sourcing device, according to one embodiment. Diagram 600 illustrates various stages and/or timing of a power negotiation protocol, such as described in FIGS. 4 and 5. Diagram 600 illustrates various control messages (e.g., requests, notifications, indications, etc.) that are exchanged between a PSE 602 and a PD 604. PSE 602 may be an example implementation of PSE 102 of FIG. 1. PD 604 may be an example implementation of PD 104A of FIG. 1.

Furthermore, diagram 600 illustrates states of a first set of conductors and a second set of conductors of a connection, such as connection 106A between PSE 102 and PD 104A. As described, the connection includes several conductors, which can be grouped into at least two sets. Depending on the implementation, one or both conductor sets can carry communication between PSE 602 and PD 604. Diagram 600 also illustrates a first set of conductors 606 and a second set of conductors 608 that show whether the first or the second set of conductors, respectively, of a given connection is enabled to carry power, as indicated by the "on" and "off" labels.

Element 610 illustrates an initial classification of PSE 602 and/or PD 604. In one embodiment, during initial classification 610, PSE 602 may detect whether PD 604 has any power-over-connection capability. This may be accomplished by PSE 602 transmitting a signal 612 (e.g., an inquiry) to PD 604 using the connection. PD 604 may provide a response (e.g., initial communication) to PSE 602 indicating whether it has any power-over-connection capability. In one embodiment, if PD 604 does not have any power-over-connection capability, it would simply not respond to this signal 612 at all. Therefore, a lack of a qualified response from PD 604 to signal 612 may indicate to PSE 602 that PD 604 does not have any power-over-connection capability.

In one embodiment, the initial classification may be performed in accordance with the IEEE 802.3 af/at powered device (PD) discovery and classification. If PSE 602 determines that PD 604 has power-over-connection capability, then PSE 602 can enable the first set of conductors of the connection for carrying power, as illustrated by the "on" label after initial classification 610. In one embodiment, PSE can enable power on the first set of conductors using the IEEE 802.3 af/at power enable standard. However, other implementations of initial classification 610 are contemplated. It is noted that in some implementations, initial classification 610 is performed using a physical layer of a communication protocol, such as Ethernet. Initial classification 610 that uses the physical layer is also referred to as layer 1 ("L1") classification. Element 610 may illustrate one embodiment of step(s) 402 of FIG. 4 and/or 502 of FIG. 5.

Once the first set of conductors is enabled for carrying power, PSE 602 can provide an initial amount of power to PD 604 using that first set of conductors. In one embodiment, the power configurations of both PD 604 and PSE 602 can be generated/updated, depending on the implementation. In some embodiments, once PD 604 receives the initial amount of power, PD 604 can communicate with other PDs on the network, such as by using PSE 602 for routing this communication. In other words, in addition to carrying power (using the first set of conductors), the connection facilitates data communication between that PD 604 and other devices on the network. Furthermore, PD 604 can also request a different power level from that initially provided by PSE 602. However, at this point, any power level requested by PD 604 is still provided using the first set of conductors.

Element 614 illustrates one or more initial notifications 614 that may be sent by either PSE 602, PD 604, or both, using one or more connections. These initial notifications 614 may be referred to as advertisements, or simply ads. PSE 602 may send such an ad to PD 604, and vice versa. For example, PSE 602 may send an ad to indicate to PD 604 (and/or other PDs) that PSE 602 is capable of providing power using both sets of conductors. PSE 602 may send such an ad using any number of connections 106A-106F (i.e., PSE 602 may broadcast this ad to all PDs and/or network devices on the network). PD 604 may send such an ad to indicate to PSE 102 that PD 604 is capable of receiving power using both sets of conductors. At this time, the second set of conductors is not yet enabled for carrying power. The transmission of this ad is shown as element 616 in diagram 600.

Element 618 illustrates PD 604 learning that PSE 602 has the capability of providing power using both sets of conductors. Element 620 illustrates PSE 602 learning that PD 604 has the capability of receiving power using both sets of conductors. Both learning elements 618 and 620 may be performed in response to receiving ad(s)/initial notification(s) 614. It is noted that one, both, or none of steps 618 and 620 may be actually implemented, as PD 604 and PSE 602 may not implement the sending of ad(s) 614.

Element 622 illustrates PD 604 sending a request 622 for activation of the second set of conductors, i.e., a request for power enable on the second set of conductors. Element 624 illustrates a transmission 624 of this activation request 622 from PD 604 to PSE 602. It is noted that one or more of elements 614-624 may illustrate one embodiment of step(s) 404 of FIG. 4 and/or 504 of FIG. 5. The request 622, referred to also as a notification, indicates that PD 604 can be supplied with a second power using the first set of conductors and a second set of conductors. Thus, PSE 602 can receive this request 622. In one implementation (e.g., if ad sending 614 is not implemented), upon receiving this request 622, PSE 602 may learn that PD 604 has the capability of receiving power using both sets of conductors. It is noted that some PDs do not have capability to use both sets of conductors for receiving power. In this case, there would be no notification(s) being sent, and PSE 602 would simply provide power to PD 604 using the first set of conductors.

Element 628 illustrates PSE 602 powering the second set of conductors. The second set of conductors is turned on, as indicated by the "on" label for the second set of conductors in FIG. 6. In one embodiment, at this point 626 a second power having a default power level may be provided by PSE 602 to PD 604 using both sets of conductors. In this embodiment, PD 604 may then negotiate another level of power that is to be provided using both sets of conductors by PSE 602.

In another embodiment, at this point 626 the additional power is not yet provided using the second set of conductors. Instead, the second set of conductors is just turned on (i.e., enabled), and additional power level negotiating may be performed to determine the amount of power that is to be provided using the second set of conductors, as described below.

Next, PSE 602 may indicate (such as by sending an indication) to PD 604 that the second set of conductors is enabled by PSE 602. Element 632 indicates a transmission 632 of this enablement indication 630 from PSE 602 to PD 604. Upon receiving this enablement indication 630, PD 604 may send 636 a power allocation request 634 to PSE 602. This allocation request 634 may include a request for a certain power level and/or other characteristics of the power that is to be provided using the first and second sets of conductors. For example, allocation request 634 may indicate a polarity for each conductor that is being used to provide power, a level of voltage and/or current for each conductor pair, an/or the total power level being provided by PSE 602 to PD 604.

Next, PSE 602 may send 640 an allocation indication 638 to PD 604. Allocation indication 638 may indicate the actual amount of power that PSE 602 can provide to PD 604. In one embodiment, PSE 602 provides power to multiple PDs, as illustrated in FIG. 1. Each of the multiple PDs can request a different amount of power, using one or both sets of conductors (depending on type of a power-over-connection capability of each PD). PSE 602 may use various power allocation algorithms to determine how much power can be provided to each of these PDs, which may be smaller than the amount requested by a particular PD. Element 642 illustrates that the power is provided by PSE 602 to PD 604 using both sets of conductors. It is noted that one or more of elements 628-642 may illustrate one embodiment of step(s) 406 of FIG. 4 and/or 506 of FIG. 5. However, not all elements 628-642 need to be executed. Furthermore, one or more of elements 628-642 can be combined, as desired. For example, PD 604 may be powered using an initial power via both sets of conductors at element 628, and PD 604 may negotiate a different power level afterwards.

Figure 7:
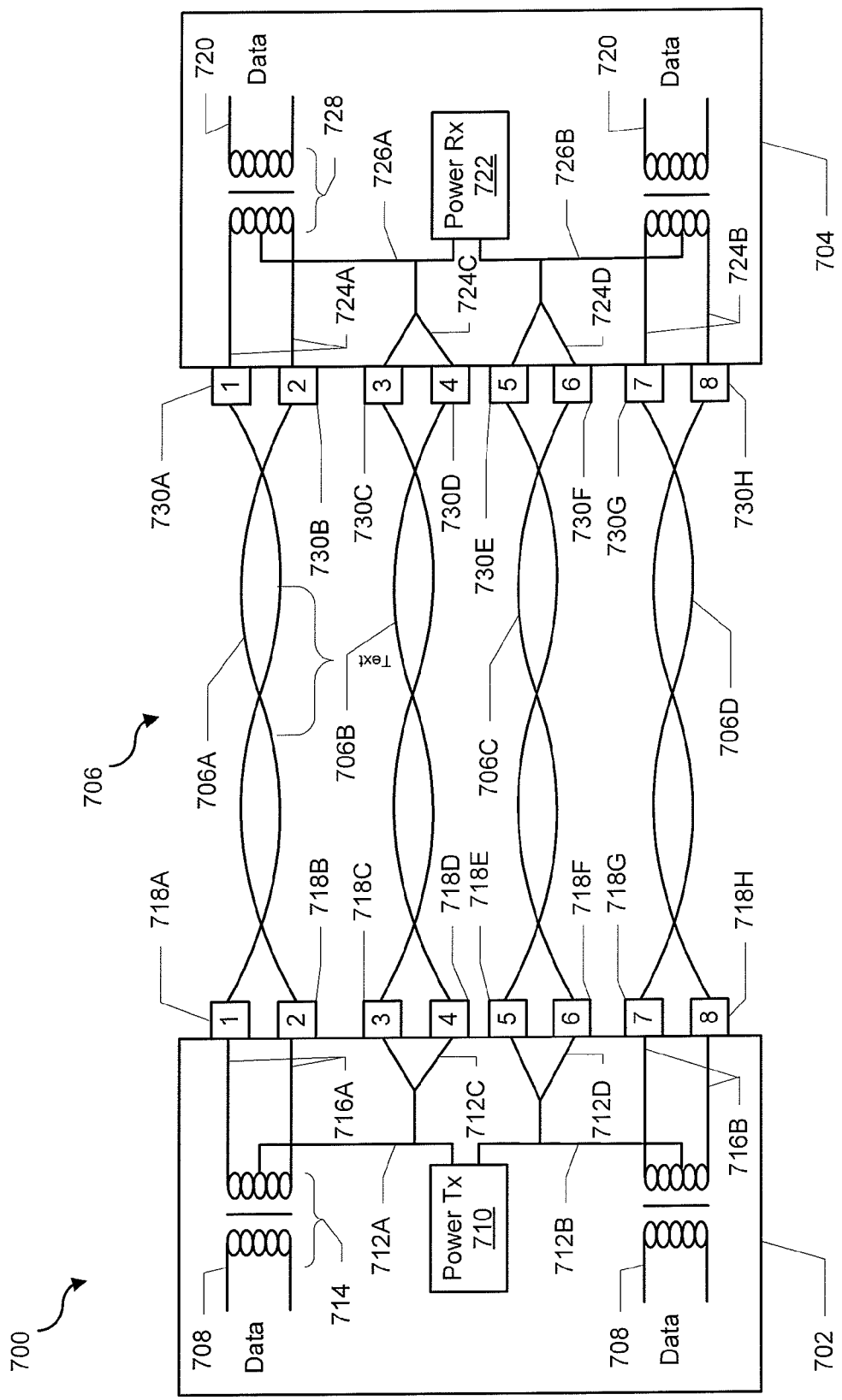
FIG. 7 is a block diagram illustrating operation of a powered device and a power sourcing device, according to one embodiment.

FIG. 7 is a block diagram 700 illustrating operation of a powered device and a power sourcing device, according to one embodiment. FIG. 7 illustrates a PSE 702 and a PD 704. PSE 702 provides power using a connection 706. PSE 702 may be an example implementation of PSE 102 of FIG. 1 and/or PSE 202 of FIG. 2. PD 704 may be an example implementation of any of PDs of FIG. 1 (e.g., PD 104A) and/or PD 302 of FIG. 3. Connection 706 may be an example implementation of any of connections 106A-106F of FIG. 1.

In one embodiment, PSE 702 includes one or more data transceivers 708, a power transmitter 710, power lines 712A-712D, a transformer 714, mixed lines 716A-716B, and input/output (I/O) ports 718A-718H. With reference to FIG. 2, PSE 702 can also include other elements such as processor(s), memory, and/or configuration module. In one embodiment, data transceiver 708, power transmitter 710, power lines 712A-712D, transformer 714, mixed lines 716A-716B, and/or I/O ports 718A-718H are included in the communication and configuration modules (e.g., of FIG. 2). PSE 702 can receive data using data transceiver 708 (e.g., from another PD/network device via a network). This data can be processed and/or routed by PSE 702.

Connection 706 may include multiple pairs of conductors, 706A-706D. In one embodiment, each set of conductors includes two pairs of conductors. For example, depending on implementation, a first set of conductors can include conductor pairs 706A and 706B, and the second set of conductors can include conductor pairs 706C and 706D. In another implementation, a first set of conductors can include conductor pairs 706C and 706D, and the second set of conductors can include conductor pairs 706A and 706B. However, a connection can use additional or fewer conductors, as desired. Furthermore, the first and second sets of conductors may use some conductors that are included in a connection, while leaving one or more conductors unused, as desired. As shown in the embodiment of FIG. 7, PSE 702 is configured to transmit and/or receive data communication using the first and fourth pairs of conductors 706A and 706D. The transformer 714 (or another device) can be used to place power onto the mixed lines 716A (and similarly for mixed lines 716B) that also can transmit data communication. Thus, mixed lines 716A and 716B can carry both power and data communication.

In one embodiment, PD 704 includes a data transceiver 720, a power receiver 722, power lines 726A-726D, a transformer 728, mixed lines 724A-724B, and input/output (I/O) ports 730A-730H. With reference to FIG. 3, PD 704 (e.g., PD 302) can also include other elements such as processor(s), memory, and/or configuration module. In one embodiment, one or more of elements of data transceivers 720, power transmitter 722, power lines 726A-726D, transformer 728, mixed lines 724A-724B, and/or I/O ports 730A-730H are included in the communication and configuration modules (e.g., of FIG. 3). PD 704 can receive and/or transmit data using data transceiver 720 (e.g., from/to PSE 702).

As shown in the embodiment of FIG. 7, PD 704 is configured to transmit and receive data communication using the first and fourth pairs of conductors 706A and 706D. The transformer 728 (or another device) can be used to place power onto the mixed lines 724A (and similarly for mixed lines 724B) that also can transmit data communication. However, in other embodiments, PD 704 can transmit and receive data communication using all four pairs of conductors 706A-706D. Thus, mixed lines 724A and 724B can carry both power and data communication.

At a start of the power negotiating protocol, PSE 702 can provide an initial power to PD 704 using a first set of conductors, such as using conductor pairs 706A and 706D. The power negotiating protocol may be initiated when PD 704 is first coupled to PSE 702, or in event PD 704 is being turned on after being in a power-off state, etc. Once PD 704 receives this initial power, PD 704 can send a notification to PSE 702 using connection 706. This notification can indicate that PD 704 can be supplied with a second power using the second set of conductors 706B and 706C. PSE 702 can then provide a second power to PD 704 using both the first and second sets of conductors 706A-706D.

In one embodiment, the notification can also indicate power architecture of PD 704. PD 704 can have various power architectures, including an independent mode and a shared mode. The independent mode indicates that PD 704 includes at least two separate power receivers (not shown). The shared mode indicates that PD 704 includes a single power receiver (such as power receiver 722).

When operating in the independent mode, a first power receiver can receive a first portion of the power that is provided using the first set of conductors (e.g., conductors 706A and 706D). A second power receiver can receive a second portion of the power that is supplied using the second set of conductors (e.g., conductors 706B and 706C). When operating in the shared mode, the single power receiver (e.g., power receiver 722) can receive the second power that is supplied using the first and the second set of conductors (e.g., conductors 706A-706D).

FIG. 8 illustrates contents 800 of an example notification that can be sent between a powered device and a power sourcing device, according to one embodiment. This notification can be an example implementation of the notification used in steps 404 and/or 504 of FIGS. 4 and 5, respectively. The notification can be included in a larger control communication packet, or it may be sent separately, as desired. FIG. 8 shows that contents 800 include a TLV type, which is a type-length-value element that is used as a part of a control packet of various protocols. Besides identifying information, e.g., of the protocol, the network, PSE, PD, etc., the TLV can also include a PSE/PD capabilities field.

FIG. 9 illustrates contents 900 of an example notification that can be sent between a powered device and a power sourcing device, according to one embodiment. Contents 900 show the PSE/PD capabilities field of the TLV packet of FIG. 8. In one embodiment, bit 0 of the PSE/PD capabilities field specifies the 4-pair PoE support, which indicates whether the PD can receive power using both the first and second sets of conductors. In this example, the "4-pair PoE support" indicates whether the PD can support power-over-connection (e.g., power-over-Ethernet) using four pairs of conductors of a connection (that can be implemented using a Cat-5 or a Cat-6 cable). In one embodiment, the notification of element 622 has this bit set to 1.

In one embodiment, bit 1 of the PSE/PD capabilities field specifies whether detection of a spare pair and/or classification of that spare pair (e.g., the second set of conductors) is required. In one embodiment, bit 2 of the PSE/PD capabilities field specifies a request by PD for the PSE to provide power using the second set of conductors, if the bit is set, or a request by the PD for the PSE to turn off power on the second set of conductors if the bit is reset (i.e., a request to disable power on the second set of conductors). In one embodiment, bit 1 of the PSE/PD capabilities field can be sent in a control packet (such as control packet 634) from PD to PSE once the PSE has enabled the second set of conductors (but has not provided any power using them yet). In one embodiment, bit 3 of the PSE/PD capabilities field specifies that the PSE has enabled the second set of conductors. For example, the allocation indication 638 may include a control packet with bit 3 being set to 1.

Figure 10:
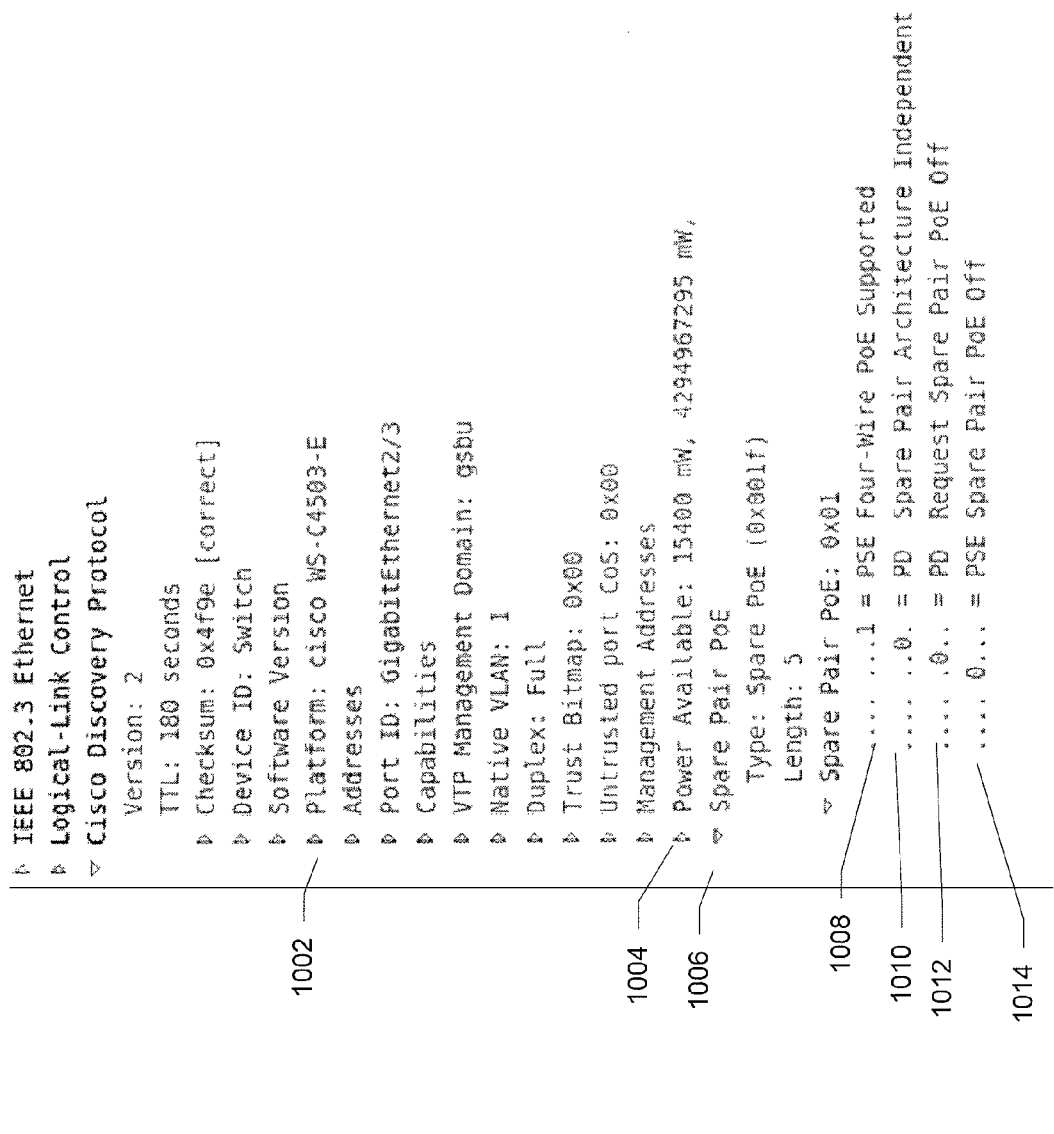
FIG. 10 illustrates example communication between a powered device and a power sourcing device, according to one embodiment.
Figure 11:
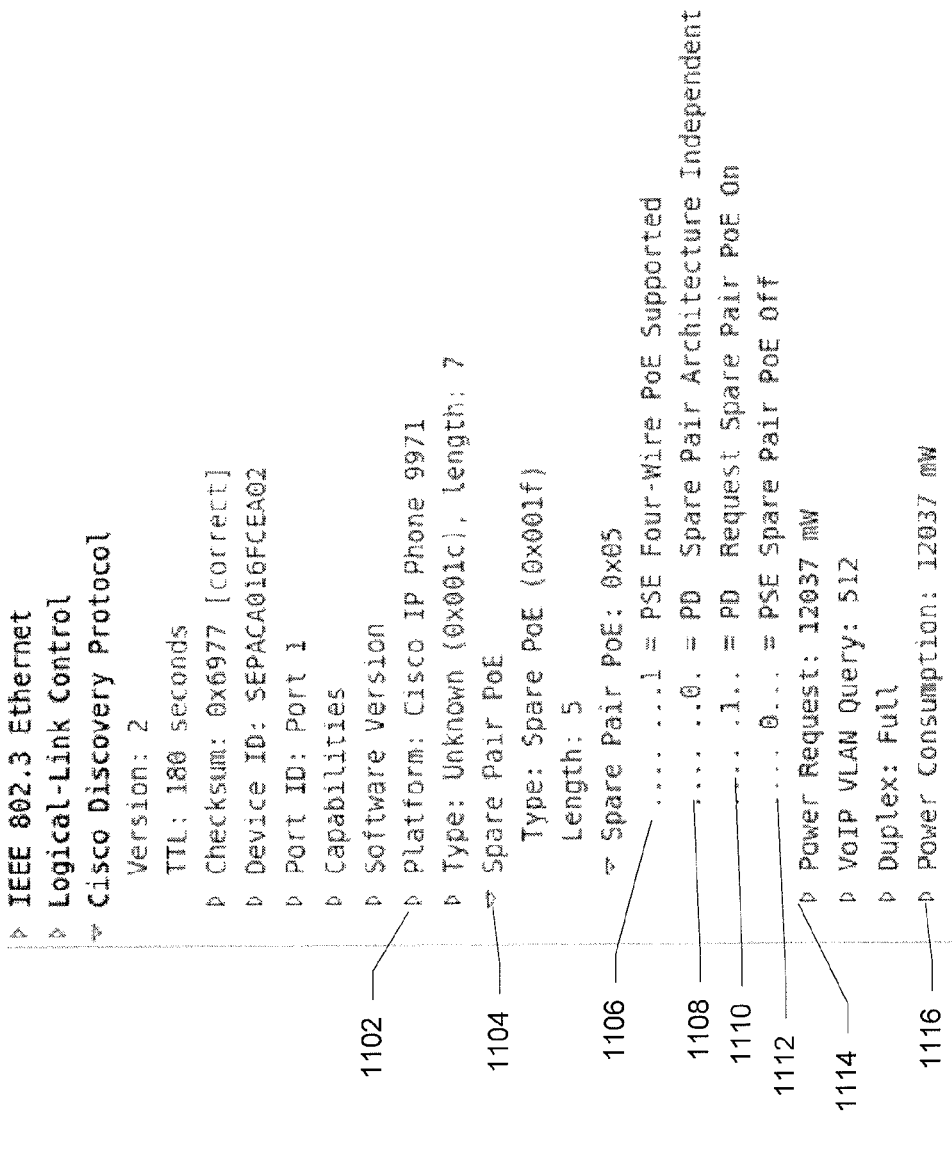
FIG. 11 illustrates another example communication between a powered device and a power sourcing device, according to one embodiment.

FIGS. 10-11 illustrate example communication between a PD and a PSE, according to some embodiments. FIG. 10 illustrates contents 1000 of an example control packet that is sent from PSE to PD. This control packet may be an ad, such as an ad 614, which can be sent from PSE to PD. This control packet contains information that indicates a platform type 1002, power available 1004 by this PSE, and a PSE/PD capabilities field 1006. PSE/PD capabilities field 1006 may be a PSE/PD capabilities field described in FIG. 9.

In one embodiment, PSE/PD capabilities field 1006 includes one or more elements (e.g., elements 1008-1014) that indicate various power-over-connection capabilities of a PSE and/or PD. Element 1008 may indicate whether a PSE supports a four-wire PoE (e.g., a power-over-connection capability that can use both conductor sets). Element 1010 may indicate whether PSE can provide power using an independent or shared power architecture. Element 1012 may indicate whether the PD requested power to be provided using the second conductor set. Element 1014 may also indicate whether the PSE is currently providing power using the second conductor set. However, other implementations are contemplated.

FIG. 11 illustrates contents 1100 of an example control packet that is sent from PD to PSE. This control packet may include a notification, such as used by the methods of FIGS. 4 and 5. This control packet contains information that indicates a platform type 1102 and a PSE/PD capabilities field 1104. PSE/PD capabilities field 1104 includes the PSE/PD capabilities field described in FIG. 9.

In one embodiment, PSE/PD capabilities field 1104 includes one or more elements (e.g., elements 1106-1012) that indicate various power-over-connection capabilities of a PSE and/or PD. Element 1006 may indicate whether a PD supports a four-wire PoE (e.g., a power-over-connection capability that can use both conductor sets). Element 1008 may indicate the power architecture of a PD. Element 1010 may indicate whether a PD is requesting that power is to be provided using the second conductor set. Element 1012 may indicate whether a PD is currently expecting power to be provided using the second conductor set. However, other implementations are contemplated.

This control packet can include a requested power field 1114, which indicates the power that is requested by this PD, such as described above with reference to element 634. This control packet can include a current power consumption field 1116, which indicates the power that is currently consumed by this PD. Requested power field 1114 and/or current power consumption field 1116 may be used by PSE in calculating power that is provided to each of the PDs.

Figure 12:
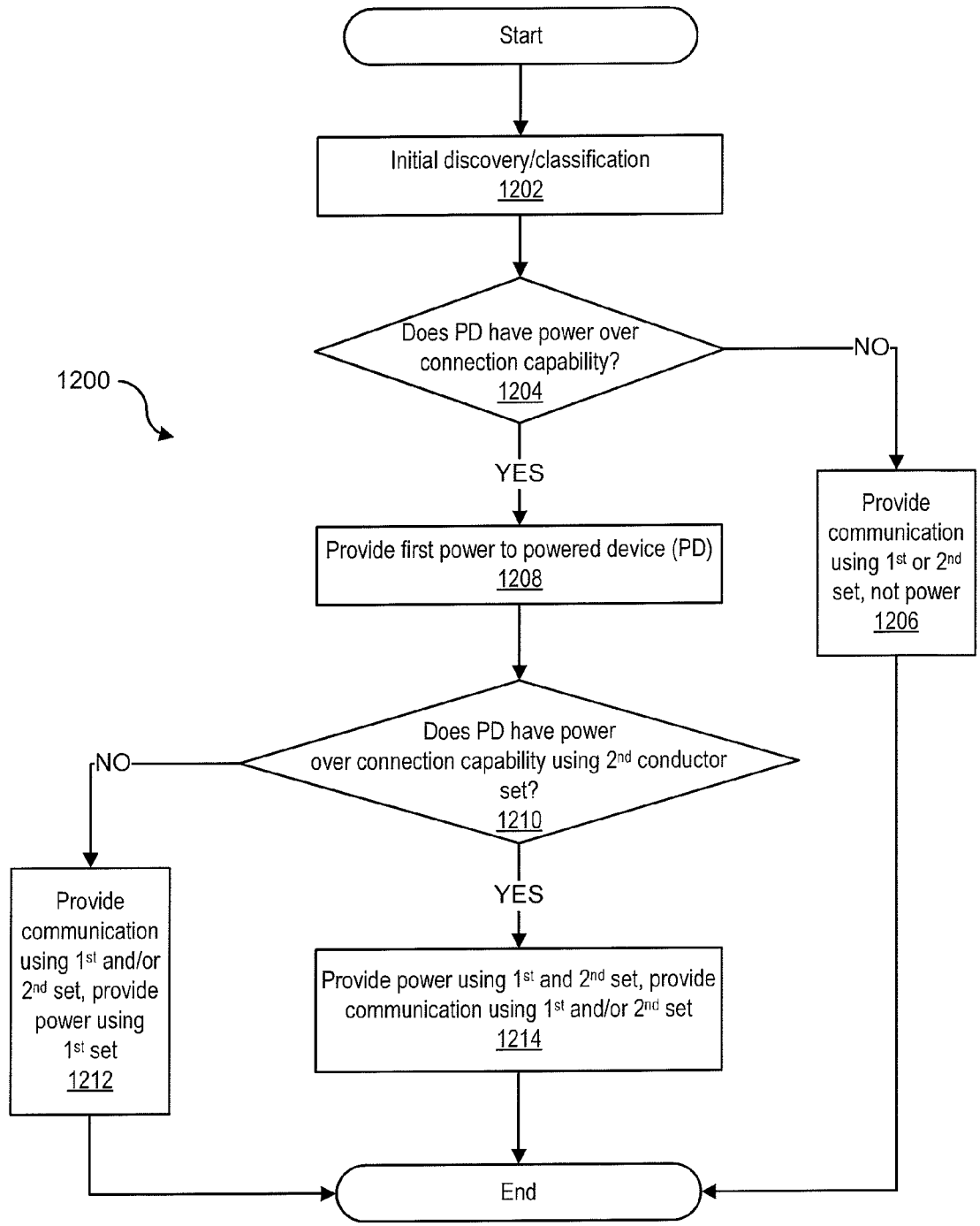
FIG. 12 is a flowchart illustrating another method of using a power sourcing device, according to one embodiment.

Referring now to FIG. 12, one embodiment of a method 1200 of a power negotiation protocol usable by a PSE is disclosed. Method 1200 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. Method 1200 is described with reference to the previous FIGs. It is noted that method 1200 is a variation of method 400 of FIG. 4.

In step 1202, an initial classification of a network device can be performed by the PSE, such as described by element 610. This initial classification can be performed, for example, by an inquiry that is transmitted using a connection from the PSE to a network device. In one embodiment, this can be performed using IEEE 802.3 af/at PD discovery and classification.

In step 1204, based on the results of the initial classification (e.g., the IEEE 802.3 af/at PD discovery and classification), the PSE can determine whether the network device has power-over-connection capability. The PSE can determine that the network device has no power-over-connection capability, or that the network device has power-over-connection capability that uses a first set of conductors.

In step 1206, if the PSE determines that the network device does not have any power-over-connection capability, then the PSE would just provide communication to that network device (e.g., using the first and/or second set of conductors of the connection). For example, in this case the network device may have an own power source, and thus would not need to be provided with power over the connection. Furthermore, a provision of power may damage that network device if that network device does not have any power-over-connection capability.

In step 1208, if the PSE determines that the network device has a power-over-connection capability, the PSE provides power to this network device using the first set of conductors of the connection. At this point, the PSE determines that the network device is a powered device that has power-over-connection capability. However, at this point, the PSE may have knowledge that this PD can receive power using a first set of conductors.

In step 1210, the PSE determines whether the PD has power-over-connection capability that uses the second set of conductors. This step can include the PD and/or PSE sending ads to the other devices (e.g., step(s) 614). The PSE determines that PD has this capability either upon receiving an ad from the PD and/or receiving a request (e.g., step 404 and/or 622) from the PD for enabling power on the second set of conductors. The ad from the PD and/or request from the PD can be referred to as a notification. However, other implementations can be used, as described herein.

In step 1212, the PSE determines that the PD has power-over-connection capability that uses the first set of conductors. In this case, the PSE would provide power to the PD using the first set of conductors, and provide communication using the first and/or second set of conductors of the connection.

In step 1214, the PSE determines that the PD has power-over-connection capability that uses both the first and the second set of conductors. In this case, the PSE would provide power to the PD using the first and the second set of conductors, and provide communication using the first and/or second set of conductors of the connection.

Figure 13:
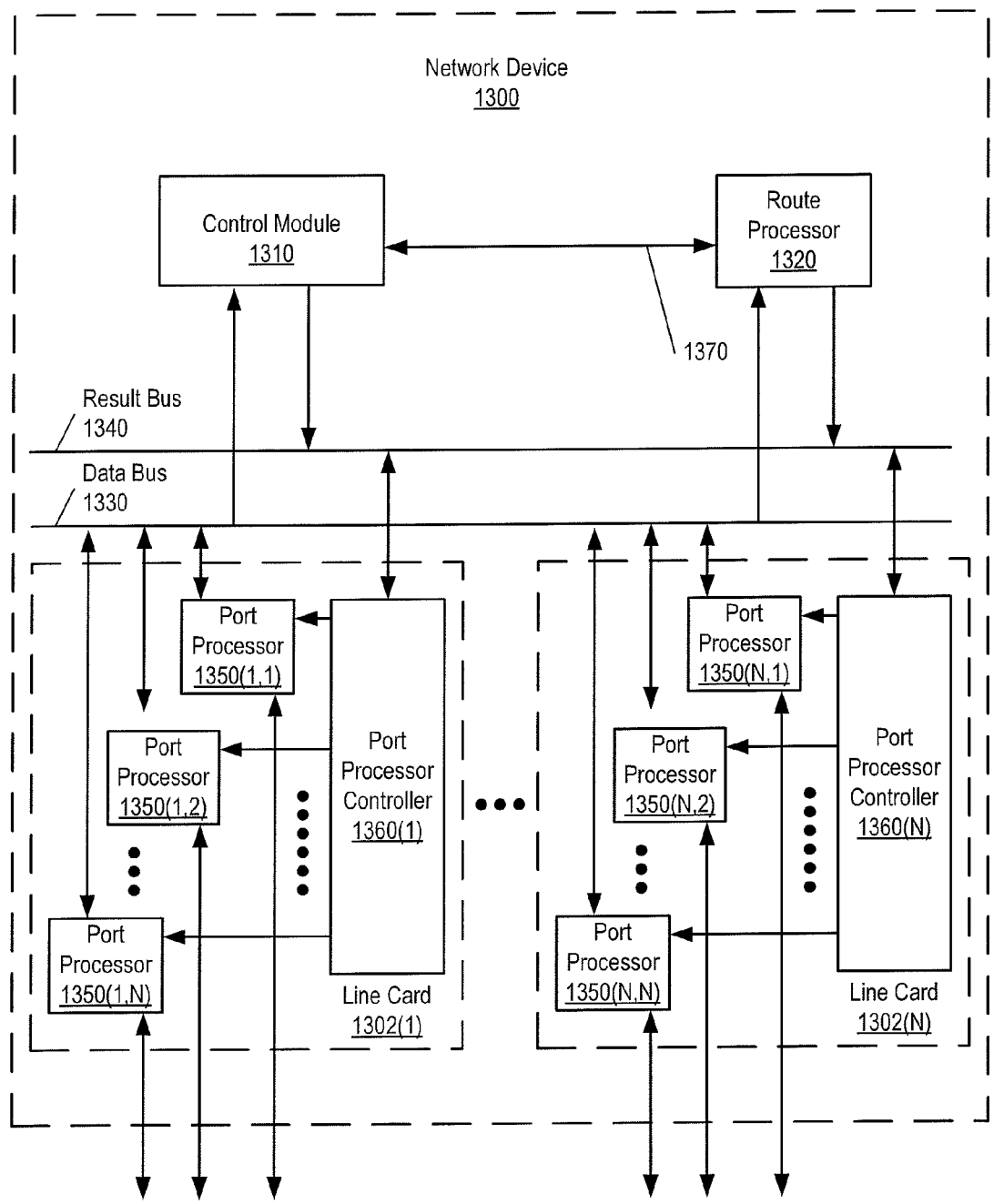
FIG. 13 is a block diagram illustrating relevant components of an example device in which the present disclosure can be implemented, according to one embodiment.

FIG. 13 is a block diagram illustrating relevant components of an example device 1300 (e.g., PSE 102, PD 104A-104C, and/or network device 108A-108C of FIG. 1). In this depiction, device 1300 includes a number of line cards (line cards 1302(1)-1302(N)) that are communicatively coupled to a control module 1310 (which can include a forwarding engine, not shown) and a route processor 1320 via a data bus 1330 and a result bus 1340. Line cards 1302(1)-(N) include a number of port processors 1350(1,1)-1350(N,N) which are controlled by port processor controllers 1360(1)-1360(N). It will also be noted that control module 1310 and route processor 1320 are not only coupled to one another via data bus 1330 and result bus 1340, but are also communicatively coupled to one another by a communications link 1370. It is noted that in alternative embodiments, each line card can include its own forwarding engine.

When a message (e.g., any of control messages (e.g., requests, notifications, indications, etc.) that may be exchanged between a PD and a PSE)) is received, the message is identified and analyzed by a network device such as device 1300 in the following manner. Upon receipt, a message (or some or all of its control information) is sent from one of the port processors 1350(1,1)-1350(N,N) at which the message was received to one or more of those devices coupled to data bus 1330 (e.g., others of port processors 1350(1,1)-1350(N, N), a forwarding engine, and/or route processor 1320). Handling of the message can be determined, for example, by a forwarding engine. For example, a forwarding engine may determine that the message should be forwarded to one or more of port processors 1350(1,1)-1350(N,N). This can be accomplished by indicating to corresponding one(s) of port processor controllers 1360(1)-1360(N) that the copy of the message held in the given one(s) of port processors 1350(1, 1)-1350(N,N) should be forwarded to the appropriate one of port processors 1350(1,1)-1350(N,N).

Device 1300 can implement configuration module 210 and/or power module 212 (e.g., in control module 1310, or in one of port processor controllers 1360(1)-1360(N) and/or in route processor 1320) in order to act as a PSE and to facilitate the power negotiation protocol. Device 1300 can alternatively implement configuration module 310 and/or a power module 312 (e.g., in control module 1310 or in one of port processor controllers 1360(1)-1360(N) and/or in route processor 1320) in order to act as a PD and to facilitate the power negotiation protocol. Device 1300 can thus implement the method(s) illustrated in FIGS. 4, 5, and/or 12.

Although embodiments of the present disclosure have been described in connection with several embodiments, the embodiments are not intended to be limited to the specific forms set forth herein. On the contrary, the present disclosure is intended to cover such alternatives, modifications, and equivalents as can be reasonably included within the scope of the present disclosure as defined by the appended claims.

What is claimed is:

1. A method, comprising:
  a first device providing a first power to a second device using a first set of conductors out of a plurality of conductors;
  the first device receiving a notification from the second device, wherein
    the notification indicates that the second device can be supplied with a second power using the first set of conductors and a second set of conductors out of the plurality of conductors;
  the first device sending an enablement indication to the second device, wherein
    the enablement indication indicates that the second set of conductors out of the plurality of conductors can be enabled to provide power; and
  the first device providing the second power to the second device using the first and the second set of conductors out of the plurality of conductors and in response to receiving the notification.

2. The method of claim 1, further comprising:
  generating a first power configuration, wherein
    the first power configuration indicates that the first device can provide the first power to the second device using the first set of conductors; and
    the first device providing the first power comprises providing the first power in accordance with the first power configuration.

3. The method of claim 2, wherein the generating the first power configuration comprises:
  the first device sending a first inquiry to the second device; and
  the first device receiving a first response from the second device, wherein
    the first response indicates capabilities of the second device, and the generating the first power configuration is performed based on the first response.

4. The method of claim 1, further comprising:
generating a second power configuration by the first device, wherein
the second power configuration indicates that the first device can provide the second power to the second device using the first and second set of conductors; and
the first device providing the second power comprises providing the second power to the second device in response to receiving the notification and in accordance with the second power configuration.

5. The method of claim 4, wherein
the second power configuration comprises a power level of the second power,
further comprising:
negotiating a modified power level of the second power, wherein
the negotiating is performed between the first device and the second device, and
the second power configuration further comprises the modified power level of the second power.

6. The method of claim 1, wherein the first device receiving the notification from the second device comprises:
the first device receiving the notification from the second device using the plurality of conductors.

7. The method of claim 1, further comprising:
prior to the first device receiving the notification, the first device sending an initial notification to the second device, wherein
the initial notification indicates that the first device can provide the second power using the first and second set of conductors.

8. The method of claim 1, wherein
the notification further indicates a power architecture of the second device,
the power architecture comprises one of an independent mode or a shared mode, wherein
the independent mode indicates that the second device comprises at least two separate power receivers, and
the shared mode indicates that the second device comprises a single power receiver.

9. The method of claim 8, wherein the independent mode further indicates that
a first of the at least two separate power receivers is operable to receive a first portion of the second power that is supplied using the first set of conductors, and
a second of the at least two separate power receivers is operable to receive a second portion of the second power that is supplied using the second set of conductors.

10. The method of claim 8, wherein the shared mode indicates that the single power receiver is operable to receive the second power that is supplied using the first set of conductors and the second set of conductors.

11. The method of claim 1, further comprising:
transmitting communication between the first device and the second device using at least one of the first set or the second set of conductors, wherein
the transmitting is performed after the first device provides the first power to the second device.

12. The method of claim 1, further comprising:
acknowledging the receiving of the notification, wherein the acknowledging comprises the first device sending an acknowledgement to the second device,
the second device is configured to enable receiving of the second power using the second set of conductors, and
the second device is configured to perform the enablement in response to receiving the acknowledgement.

13. The method of claim 1, further comprising:
the first device receiving a power allocation request from the second device.

14. A method, comprising:
a powered device receiving a first power from a power provider using a first set of conductors out of a plurality of conductors;
the powered device sending a notification to the power provider, wherein
the notification indicates that a second power can be supplied using the first set of conductors and a second set of conductors out of the plurality of conductors;
the powered device receiving an enablement indication from the power provider, wherein
the enablement indication indicates that the second set of conductors out of the plurality of conductors can be enabled to provide power; and
the powered device receiving the second power from the power provider using the first and the second set of conductors.

15. The method of claim 14, wherein
receiving the first power from the power provider comprises receiving the first power in accordance with a first power configuration, wherein
the first power configuration indicates that the first power can be supplied using a first set of conductors.

16. The method of claim 15, further comprising:
sending a first inquiry to the powered device; and
generating the first power configuration in response to receiving a first response from the powered device, wherein
the first response indicates capabilities of the powered device, and
the powered device is configured to generate the first response in response to receiving the first inquiry.

17. The method of claim 14, wherein
receiving the second power from the power provider comprises receiving the second power in accordance with a second power configuration, wherein
the second power configuration indicates that the second power can be supplied using the first and second set of conductors.

18. The method of claim 14, wherein the sending the notification comprises:
sending the notification using one or more of the first set of the second set of conductors.

19. The method of claim 14, wherein
the notification further indicates a power architecture,
the power architecture comprises one of:
independent mode, or
a shared mode
the independent mode is indicative of comprising at least two separate power receivers, and
the shared mode is indicative of comprising a single power receiver.

20. A system, comprising:
a communications module configured to receive a notification from a device and send an enabling indication to the device using one or more of a first set or a second set of conductors out of a plurality of conductors, wherein the notification indicates that a second power can be provided to the device using the first set of conductors and the second set of conductors, and the enablement indication indicates that the second set of conductors out of the plurality of conductors can be enabled to provide power; and a power supply module configured to provide a first power or the second power using one or more of the first set or the second set of conductors, wherein the power supply is configured to provide the first power to the device using the first set of conductors, and the power supply is configured to provide the second power to the device in response to the communication module receiving the notification and using the first set and the second set of conductors.

21. The system of claim 20, further comprising:

a configuration module configured to generate a first and a second power configuration, wherein the first power configuration indicates that a first power can be provided to the device using the first set of conductors, the configuration module is configured to generate the second power configuration in response to the communication module receiving the notification, the second power configuration indicates that the second power can be provided to the device using the first set and the second set of conductors, the power supply is configured to provide the first power to the device in accordance with the power first configuration, and the power supply is configured to provide the second power to the device in accordance with the second power configuration.

22. The system of claim 20, wherein the notification further indicates a power architecture of the device, the power architecture comprises one of an independent mode or a shared mode, the independent mode is indicative of the device comprising at least two separate power receivers, and the shared mode is indicative of the device comprising a single power receiver.

23. The system of claim 20, wherein the configuration module is further configured to establish data communication with the device using at least one of the first set or the second set of conductors, and the configuration module is configured to establish the data communication after the power module provides the first power to the device.

24. A system, comprising:

a device configured to receive a first power from a power provider;

a communications module configured to send a notification to the power provider and receive an enabling indication from the power provider using one or more of a first set or a second set of conductors out of a plurality of conductors, wherein the notification indicates that the power provider can provide a second power using the first set of conductors and the second set of conductors, and the enablement indication indicates that the second set of conductors out of the plurality of conductors can be enabled to provide power; and a power module configured to receive the first power or the second power using one or more of the first set or the second set of conductors, wherein the power module is configured to receive the first power using the first set of conductors, and the power module is configured to receive the second power using the first set and the second set of conductors.

25. The system of claim 24, further comprising:

a configuration module configured to generate a first and a second power configuration, wherein the first power configuration indicates that the first power can be provided using the first set of conductors, the second power configuration indicates that the second power can be provided using the first and the second set of conductors, the power module is configured to receive the first power in accordance with the first power configuration, and the power module is configured to receive the second power in accordance with the second power configuration.

26. The system of claim 25, wherein the configuration module is further configured to establish data communication with the power provider using at least one of the first set or the second set of conductors, and the configuration module is configured to establish the data communication after the power module receives the first power.

27. The system of claim 24, wherein the notification further indicates a power architecture, the power architecture comprises one of:

independent mode, or a shared mode the independent mode is indicative of comprising at least two separate power receivers, and the shared mode is indicative of comprising a single power receiver.

* * * * *

UNITED STATES PATENT AND TRADEMARK OFFICE
CERTIFICATE OF CORRECTION

Page 1 of 1

PATENT NO. : 9,075,594 B2
APPLICATION NO. : 13/292259
DATED : July 7, 2015
INVENTOR(S) : Vaibhav S. Katkade, Premkumar Jonnala and Anoop Vetteth It is certified that error appears in the above-identified patent and that said Letters Patent is hereby corrected as shown below:

Title Page

Item (57), ABSTRACT

Line 6, replace: "a plurality" by -- the plurality --
Line 8, replace: "a second power" by -- the second power --
Line 8, replace: "and a" by -- and the --

Claims

Column 18
Line 52, in Claim 18, replace: "of" by -- or --
Column 19
Line 10, in Claim 20, insert: -- module -- immediately after "the power supply"
Line 12, in Claim 20, insert: -- module -- immediately after "the power supply"
Line 28, in Claim 21, insert: -- module -- immediately after "the power supply"
Line 31, in Claim 21, insert: -- module -- immediately after "the power supply"
Line 43, in Claim 23, replace: "claim 20" by -- claim 21 --
Line 48, in Claim 23, replace: "power module" by -- power supply module --

Signed and Sealed this
Twelfth Day of April, 2016

Michelle K. Lee
*Director of the United States Patent and Trademark Office*